United States Patent [19]

Yamazaki et al.

[11] Patent Number: 5,007,693
[45] Date of Patent: Apr. 16, 1991

[54] METHOD FOR CONTROLLING POLARIZATIONS OF SIGNAL LIGHTS IN AN OPTICAL FREQUENCY DIVISION MULTIPLEX COHERENT COMMUNICATION SYSTEM

[75] Inventors: Shuntaro Yamazaki; Takashi Ono; Haruhito Shimizu, all of Tokyo, Japan

[73] Assignee: NEC Corporation, Tokyo, Japan

[21] Appl. No.: 494,381

[22] Filed: Mar. 16, 1990

[30] Foreign Application Priority Data

Mar. 16, 1989 [JP] Japan .................................. 1-65716

[51] Int. Cl.$^5$ ..................... H04B 10/00; G02F 2/00
[52] U.S. Cl. .......................... 350/96.13; 350/96.15; 350/371; 350/374; 370/2; 370/3; 455/615; 455/619
[58] Field of Search .............. 350/96.13, 96.14, 96.15, 350/387, 376, 371, 374; 356/345, 351; 455/615, 619; 370/2, 3

[56] References Cited

U.S. PATENT DOCUMENTS

| | | | |
|---|---|---|---|
| 3,727,062 | 4/1973 | Foster | 370/3 |
| 3,908,121 | 9/1975 | Riseberg et al. | 350/96.13 |
| 4,467,468 | 8/1984 | Miller | 370/3 |
| 4,703,474 | 10/1987 | Foschini et al. | 370/3 |
| 4,831,663 | 5/1989 | Smith | 455/615 |
| 4,856,093 | 8/1989 | Mohr | 455/619 |
| 4,888,817 | 12/1989 | Ryu et al. | 455/615 |
| 4,903,342 | 2/1990 | Yamazaki | 455/619 |
| 4,912,527 | 3/1990 | Yamazaki | 370/3 |
| 4,956,834 | 9/1990 | Coleman | 350/96.14 |
| 4,970,713 | 11/1990 | Imoto | 350/96.13 |

Primary Examiner—Paul M. Dzierzynski
Assistant Examiner—Martin Lerner
Attorney, Agent, or Firm—Sughrue, Mion, Zinn, Macpeak & Seas

[57] ABSTRACT

Frequency division multiplex signal lights are propagated through an optical fiber, and polarizations of the lights are collectively controlled by a polarization controller. The polarization-controlled signal lights are received separately in receiving systems including optical heterodyne or homodyne receivers. In the collective polarization control, a step is selected from steps of controlling relative polarization states of local oscillation lights to coincide to each other, receiving a control signal from one of the receiving systems which receives a signal light of a frequency to be allocated in the center of a frequency band of the signal lights or the vicinity thereof, and dividing the frequency division multiplex signal lights into plural groups, thereby controlling polarizations collectively in each of the plural groups. One of the polarizations of the signal lights may be orthogonal to the others, and one of the polarizations of the local oscillation lights may be orthogonal to the others correspondingly.

4 Claims, 6 Drawing Sheets

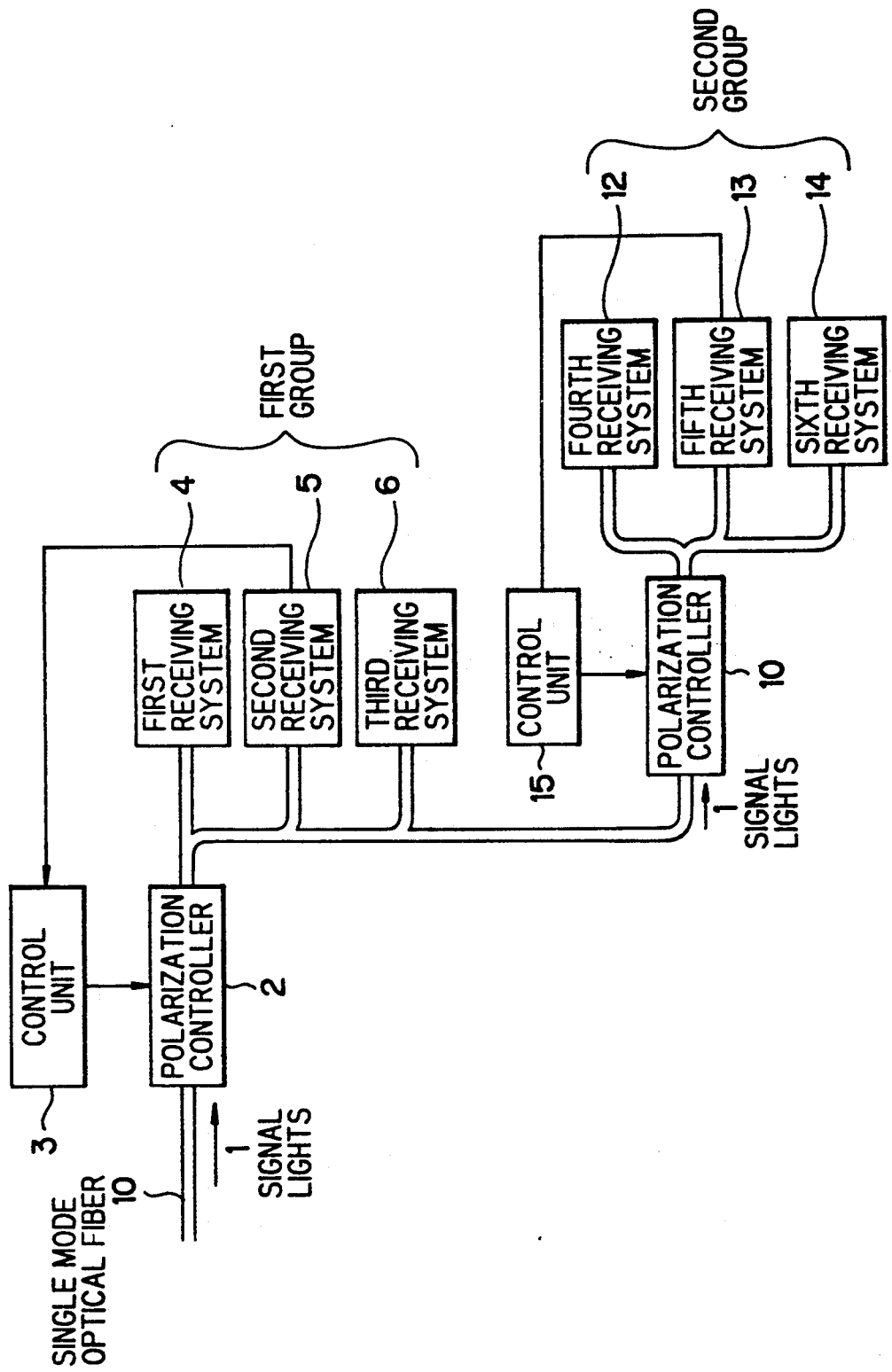

BY COLLECTIVE
POLARIZATION
CONTROL

METHOD FOR CONTROLLING POLARIZATIONS OF SIGNAL LIGHTS IN AN OPTICAL FREQUENCY DIVISION MULTIPLEX COHERENT COMMUNICATION SYSTEM

FIELD OF THE INVENTION

This invention relates to a method for controlling polarizations of signal lights in an optical frequency division multiplex (defined "FDM" hereinafter) coherent communication system, and more particularly to, a method for compensating fluctuations of signal light polarizations in an optical FDM coherent communication system.

BACKGROUND OF THE INVENTION

Optical heterodyne and homodyne detection communication systems are well adapted to a long distance and large capacity optical communication system, because a FDM communication with a high receiving sensitivity and a high density of information is realized in the systems. In such a communication system, the compensation of a fluctuation of a signal light polarization is very important to increase a reliability in a practical use. This compensation suppresses the decrease of a receiving sensitivity which is caused at a receiving terminal by the change of a polarization of a signal light propagating through an optical fiber. This polarization change is resulted from a fluctuation of birefringence in the optical fiber which is induced by the change of an environmental temperature and an external pressure around the optical fiber. For the purpose of compensating a polarization fluctuation, an automatic polarization controlling method and a polarization diversity method are available.

In these two methods the automatic polarization controlling method has an advantage as compared to the polarization diversity method, in that the former is simpler in construction of a receiving system than the latter, and a receiving sensitivity of the former is higher than that of the latter Furthermore, the former has a possibility, in which the receiving system becomes much simpler in construction, because a collective polarization control of all received FDM signal lights can be carried out by use of a common polarization controller. These are described in the Japanese patent laid-open No. 62-171335 entitled "a method for propagating multi-wavelength lights through an optical fiber".

In general, where lights having different frequencies are propagated through an optical fiber, polarizations of the lights becomes different, even if the polarizations are the same to each other in a state prior to the propagation. For this reason, even if one of the polarizations is controlled in a selected channel to be constant among the signal lights at a receiving terminal, a receiving sensitivity is deteriorated in systems for receiving signal lights of the remaining channels, because the polarizations are not constant in the signal lights of other wavelengths.

This is induced in the conventional polarization methods as a disadvantage, and "Journal of Lightwave Technology, Vol. 6, No. 7, July 1988" explains this phenomenon as a polarization dispersion which is caused in a collective polarization control by a propagating delay time difference between principal modes of polarizations orthogonal to each other in a single mode optical fiber on pages 1185 to 1190 thereof in the report of "Polarization Dispersion and Principal States in a 147-km Undersea Lightwave Cable" by C. D. Poole et al.

Accordingly, it is an object of this invention to provide a method for controlling polarizations of signal lights in an optical FDM coherent communication system, in which a polarization dispersion is suppressed in a collective polarization control, thereby avoiding a deterioration of a receiving sensitivity.

According to this invention, a method for controlling polarizations of signal lights in an optical FDM coherent communication system, comprises steps of:

propagating frequency division multiplex signal lights through an optical fiber;

controlling polarizations of the frequency division multiplex signal lights collective-y; and receiving the frequency division multiplex signal lights having collectively controlled polarizations separately by receiving systems including optical heterodyne or homodyne receivers;

wherein the polarization controlling step includes a step selected from steps of:

controlling relative polarization states of local oscillation lights in the receiving systems to coincide to each other;

receiving a control signal from one of the receiving systems which receives a signal light of a frequency to be allocated in the center of a frequency band of the signal lights or the vicinity thereof; and dividing the frequency division multiplex signal lights into plural groups, polarizations being collectively controlled in each of the plural groups.

According to another feature of the invention, a method for controlling polarizations of signal lights in an optical FDM coherent communication system, comprises steps of:

propagating frequency division multiplex signal lights through an optical fiber at least one of the signal lights having a polarization orthogoral to those of the other signal lights;

controlling polarizations of the frequency division multiplex signal lights collectively;

receiving the frequency division multiplex signal lights having collectively controlled polarizations separately by receiving systems including optical heterodyne or homodyne receivers; and controlling polarizations of local oscillation lights in the receiving systems, whereby a polarization of at least one of the local oscillation lights corresponding to the at least one of the signal lights is orthogonal to those of the other local oscillation lights.

BRIEF DESCRIPTION OF THE DRAWINGS

This invention will be explained in more detail in conjunction with appended drawings, wherein:

FIG. 4 is a block diagram showing a method for controlling polarizations of signal lights in a second preferred embodiment according to the invention.

DESCRIPTION OF THE PREFERRED EMBODIMENTS

Before explaining a method for controlling polarizations of signal lights in an optical FDM coherent communication system in a preferred embodiment according to the invention, the aforementioned polarization dispersion will be explained in FIGS. 1A and 1B, wherein polarizations of signal lights having two wavelengths are indicated on Poincare, sphere.

Figure 1A:
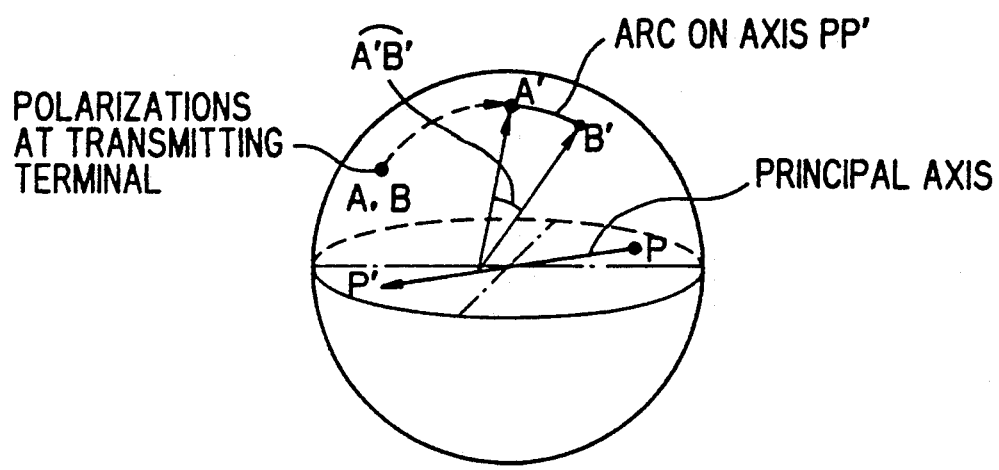
FIGS. 1A and 1B are explanatory diagrams showing Poincare, sphere on which polarization change of lights are defined.

In FIG. 1A, the two polarizations of the two signal lights are coincided with each other on points A and B in a state prior to a propagation thereof. After the propagation of the two signal lights through an optical fiber, one of the polarizations is shifted from the point A to a point A', while the other polarization is shifted from the point B to a point B' which is not always equal to the point A' due to a polarization dispersion. The position of the point B' is on a periphery of a circular arc defined on Poincare sphere by rotating the point A' around a principal axis passing through two principal states P and P' of the optical fiber. An angle A'B' between the points A' and B' on the basis of the principal axis is proportional to the polarization dispersion and a frequency interval of the signal lights. However, the angle is not dependent on incident polarizations of the signal lights to the optical lights. Furthermore a distance A'B' connecting the points A'and B'changes dependent on a position of the distance A'B'relative to the principal axis PP' passing through the center of Poincare, sphere That is, where the distance A'B'is positioned on a periphery of Poincare, sphere in other words, where the distance A'B'is the farthest from the principal axis, the distance A'B'is of the maximum value. On the other hand, where the distance A'B'is positioned on a point, at which the principal axis crosses Poincare sphere, the distance A'-B'is zero.

Figure 1B:
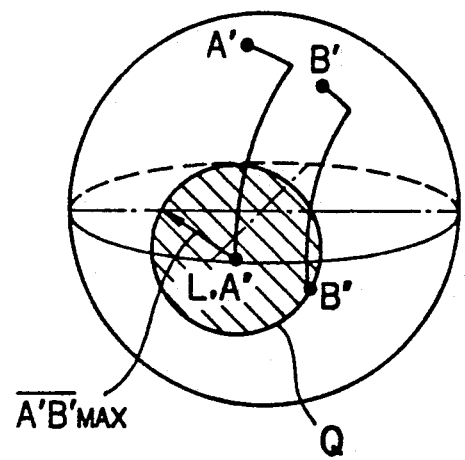

In FIG. 1B, there is shown a polarization L of a local oscillation light for receiving the signal light of the polarization A'at a receiving terminal, wherein the polarization A'is controlled to be coincided with the polarization L. The point A'which is controlled to coincide with a point A"is shifted to the point A"Simultaneously, the point B'is shifted to keep distance A'B'relative to the point A'. As a result, a destination point B" of the point B'having a maximum distance is on a periphery of a circle Q having a maximum radius A'B'$_{MAX}$ relative to the point A", and the point B'is moved in the hatched circle Q which is defined by the maximum radius A'B'$_{MAX}$ in any state. The circle Q indicating a range, in which a polarization of the point B" changes, becomes large in radius in proportional to a polarization dispersion and a frequency interval of the two signal lights, so that a receiving sensitivity is deteriorated in a system for receiving the signal light of the polarization of the point B" in a collective polarization control This disadvantage is overcome in the invention.

Next, a method for controlling polarizations of signal lights in an optical FDM coherent communication system in a first preferred embodiment will be explained in FIG. 2, wherein an optical frequency shift keying (FSK) FDM heterodyne detection communication system is realized with 600 Mb/s for three channels. In this system, a single mode optical fiber 10 of 100 km having a polarization dispersion of 3 ps is utilized to propagate three signal lights 1 of first to third FDM channels therethrough. The optical fiber 10 is connected to a polarization controller 2, in which a polarization control is carried out by applying a pressure to the optical fiber 10. The polarization controller 2 is connected to an optical divider 7, by which the three signal lights 1 are divided to be supplied to first to third receiving systems 4, 5 and 6, each including a local oscillation light source 8 and a receiving circuit 11. The first to third receiving systems 4, 5 and 6 receive the first to third channels having frequencies 200.00 THz (defined "$f_1$" hereinafter), 200.01 THz (defined "$f_2$" hereinafter), and 200.02 THz (defined "$f_3$" hereinafter), respectively, by optical heterodyne detections. In the second receiving system 5, a level of an intermediate frequency signal which is obtained by the optical heterodyne detection is detected in an envelope detection circuit included in a receiving circuit 11. The envelope detection circuit is connected to a control unit 3, by which the polarization controller 2 is controlled to apply an appropriate pressure to the optical fiber 10, so that the intermediate frequency signal is of the maximum value. The local oscillation light sources 8 are set in advance to emit local oscillation lights having the same polarizations, of, for instance, linear polarizations of 45° as illustrated therein, respectively, which are propagated through polarization maintaining fibers 9 to the receiving circuits 11.

In operation, the local oscillation light source 8 is controlled to emit a local oscillation light having a polarization which is equal to the center point L of the circle Q in one of the receiving systems 4, 5 and 6 for receiving a signal light having a polarization corresponding to the polarization B" as explained in FIG. 1B, so that a relative maximum deviation of polarizations is suppressed to its smallest value between the signal and local oscillation lights. In this method, a polarization dispersion can be decreased to the smallest extent.

Figure 2:
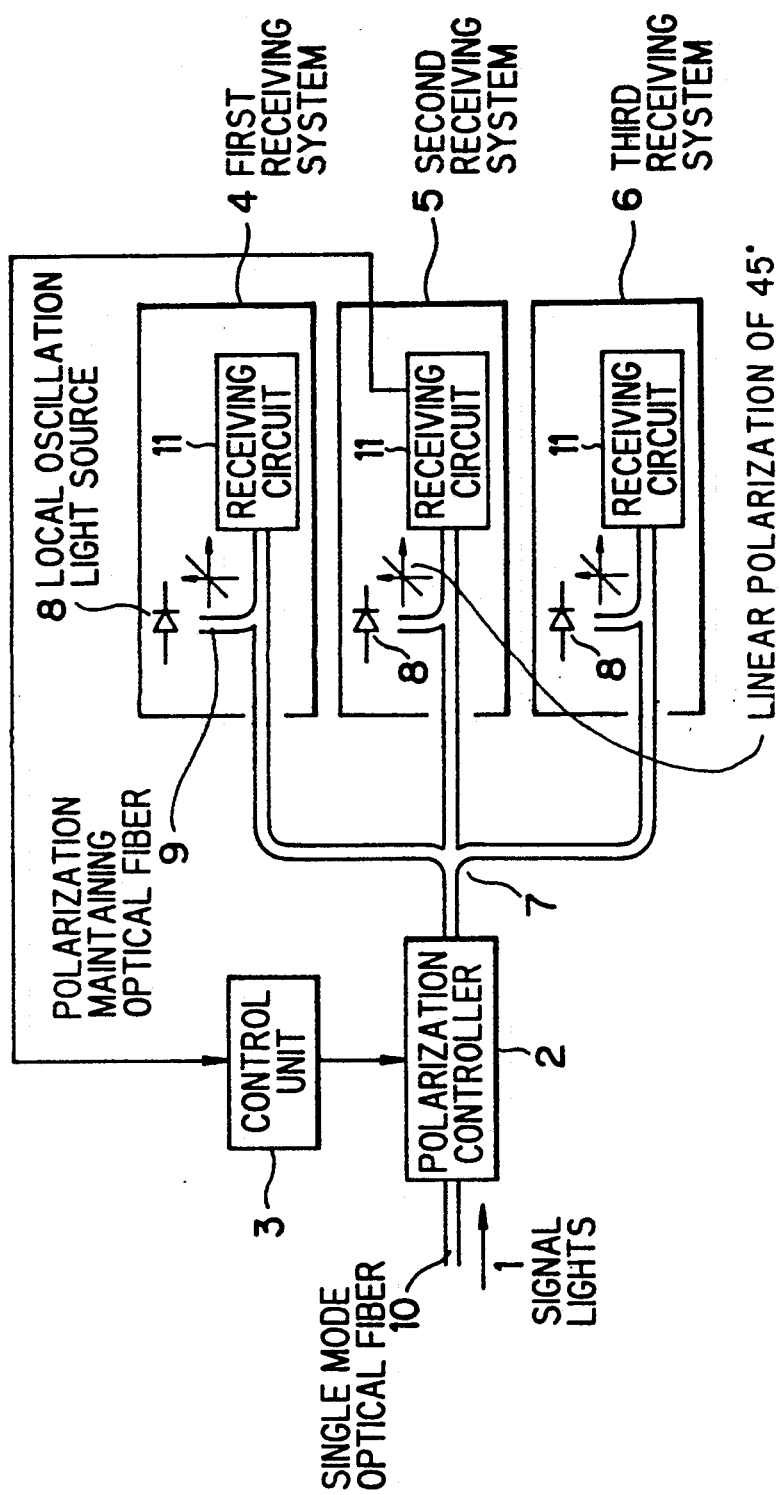
FIG. 2 is a block diagram showing a method for controlling polarizations of signal lights in a first preferred embodiment according to the invention.
Figure 3A:
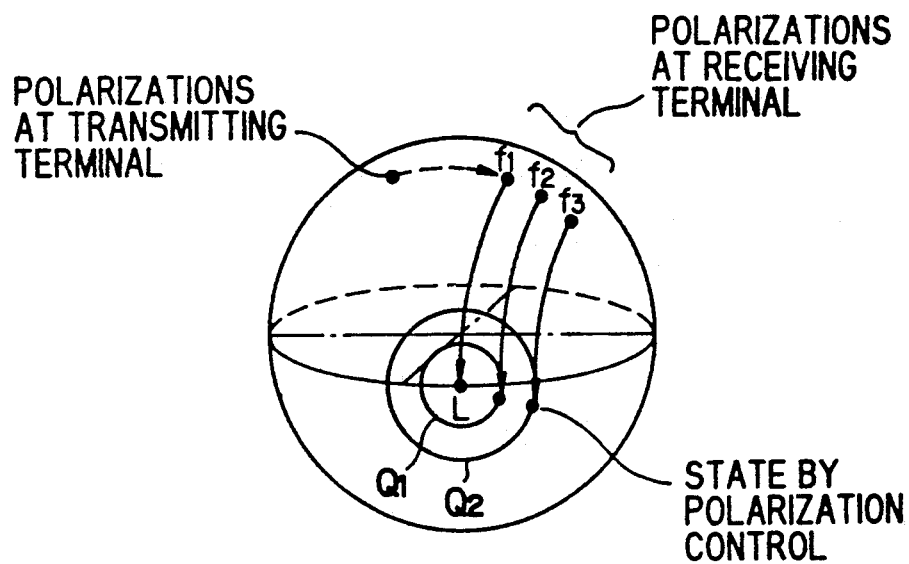
FIGS. 3A and 3B are explanatory diagrams showing Poincare sphere on which polarization changes of lights are defined in the first preferred embodiment.

In another operation, the control signal is supplied from the receiving system 5 to the control unit 3 as shown in FIG. 2. On the contrary, assuming that the control signal is obtained from the receiving system 4, in which the signal light having the frequency $f_1$ is received, circles $Q_1$ and $Q_2$ indicating ranges of the fluctuation in polarizations of the signal lights having the frequencies $f_2$ and $f_3$ become large in proportional to frequency differences from the frequency $f_1$ as shown in FIG. 3A. Therefore, a receiving sensitivity is much deteriorated in the receiving system 6 receiving the signal light of the frequency $f_3$ as compared to those in the receiving systems 4 and 5 receiving the signal lights of the frequencies $f_1$ and $f_2$.

Figure 3B:
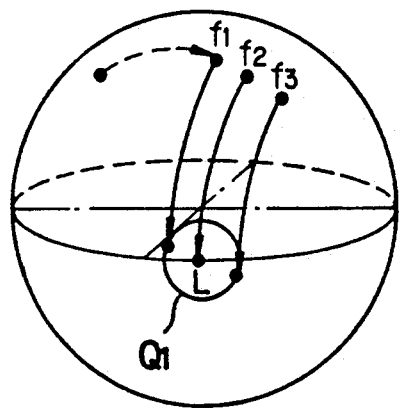

On the other hand, the control signal is obtained from the receiving system 5 receiving the signal light of the frequency $f_2$ in this embodiment as described before, the fluctuation ranges of the polarizations of the signal lights having the frequencies $f_1$ and $f_3$ are suppressed as indicated in FIG. 3B by a circle $Q_1$. As a result of this control, the receiving sensitivity is deteriorated for the first to third channels to the minimum extent. In more detail, polarizations of the local oscillation light sources 8 of the receiving systems 4, 5 and 6 are set to be in the same state as indicated in FIG. 3B by the letter L on Poincare sphere. Thus, the signal light polarizations of the frequencies $f_1$, $f_2$ and $f_3$ are collectively controlled by the polarization controller 2 which is controlled by the control unit 3 receiving the control signal based on a level of the intermediate frequency signal in the second receiving system 5, thereby stabilizing the polarizations to be inside the circle $Q_1$ as shown in FIG. 3B. As described before the frequency interval of the signal light is 10 GHz, and the polarization dispersion of the optical fiber 10 is 3 ps. In this construction, the deterioration of the receiving sensitivity is suppressed to be 0.04 dB in the first and third receiving systems 4 and 6 at the maximum. In this preferred embodiment, the polarization maintaining optical fibers 9 are used between the local oscillation light sources 8 and the receiving circuits 11, thereby setting the polarizations of the local oscillation light to be in the same state.

A method for controlling polarizations of signal lights in an optical FDM coherent communication system in the second embodiment according to the invention will be explained in FIG. 4, wherein an optical FDM heterodyne detection communication system is embodied with 600 Mb/s for a frequency shift keying (FSK) 6 channel communication. In this system, a single mode optical fiber 10 of 50 km having a polarization dispersion of 2 ps is utilized, and like parts are indicated by like reference numerals as used in FIG. 2, except that fourth to sixth receiving systems 12, 13 and 14 are added for fourth to sixth channels, and a second control unit 15 and a second polarization controller 16 are provided to control polarizations of signal lights 1 for the fourth to sixth channels. In a first group including the first to third receiving systems 4, 5 and 6, a control signal is supplied from the second receiving system 5 to the first control unit 3, thereby controlling the polarization controller 2 to carry out a collective control of polarizations of the signal lights 1 propagating through the optical fiber 10, and, in a second group including the fourth to sixth receiving systems 12, 13 and 14, a control signal is supplied from the fifth receiving system 13 to the control unit 15, thereby controlling the polarization second controller 16 to carry out a collective control of polarizations of signal lights which are supplied to the fourth to sixth receiving systems 12 to 14.

In operation, the signal lights 1 of first to sixth FDM channels having an frequency interval of 10 GHz are collectively controlled in polarization by the first polarization controller 2, and then divided into signal lights supplied to the first to third receiving systems 4, 5 and 6 for the first group and to the second polarization controller 16. In the second group, the signal lights controlled in polarization by the second polarization controller 16 are supplied to the fourth to sixth receiving systems 12, 13 and 14. In this preferred embodiment, the first to sixth channels are set to have frequencies ranging 200.00 THz to 200.05 THz by a frequency interval of 10 GHz (defined "$f_1$ to $f_6$" hereinafter), such that the first to sixth channels are separately received in the first to sixth receiving systems 4, 5, 6, 12, 13 and 14.

Figure 5A:
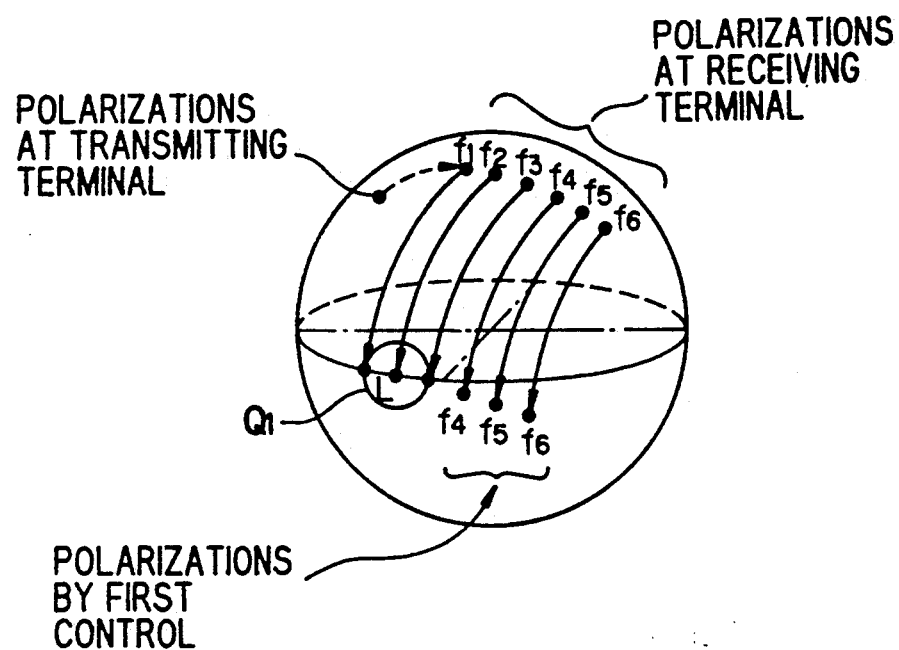
FIGS. 5A and 5B are explanatory diagrams showing Poincare sphere on which polarization changes of lights are defined in the second preferred embodiment.
Figure 5B:
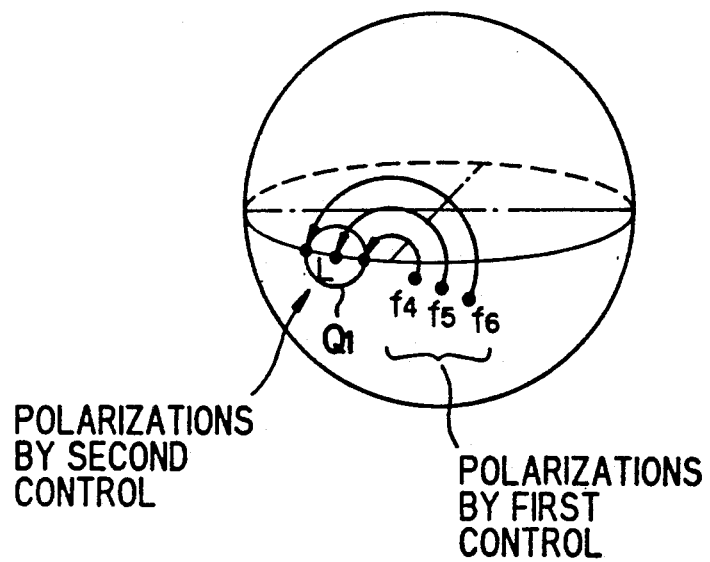

FIGS. 5A and 5B show a collective control of signal light polarizations in this preferred embodiment, wherein a state after a first polarization control is shown in FIG. 5A, and a state after a second polarization control is shown in FIG. 5B.

In the first polarization control, the polarizations of the signal lights having the frequencies $f_1$ to $f_3$ are controlled to be inside the circle $Q_1$, the center of which is indicated by the letter L corresponding to the polarizations of the local oscillation lights, by the polarization controller 2 which is controlled by the control unit 3 receiving the control signal from the receiving system 5. Then, in the second polarization control, the polarizations of the signal lights having the frequencies $f_4$ to $f_6$ are controlled to be inside the circle $Q_1$ by the polarization controller 16 which is controlled by the control unit 15 receiving the control signal from the receiving system 13.

As described before, the frequency interval is 10 GHz, and the polarization dispersion value is 2 ps, so that the deterioration of a receiving sensitivity is suppressed to be 0.02 dB at the maximum in any channel among the first to sixth channels by the collective polarization control of the invention.

Next, a degradation of a receiving sensitivity will be calculated as follows.

Figure 6A:
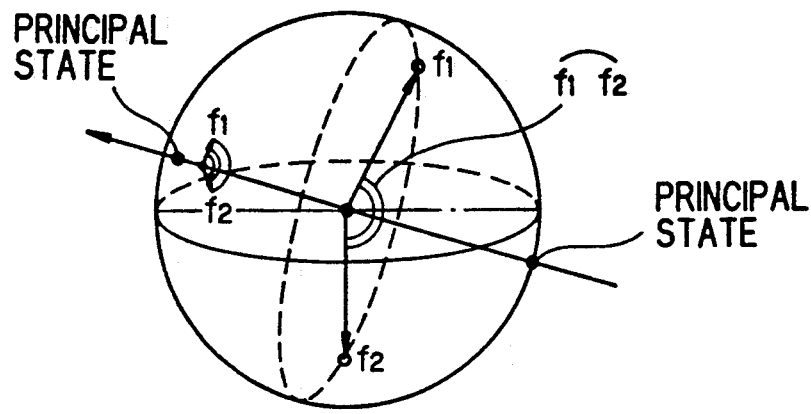
FIGS. 6A and 6B are explanatory diagrams showing Poincare sphere for explaining a calculation of a receiving sensitivity deterioration.
Figure 6B:
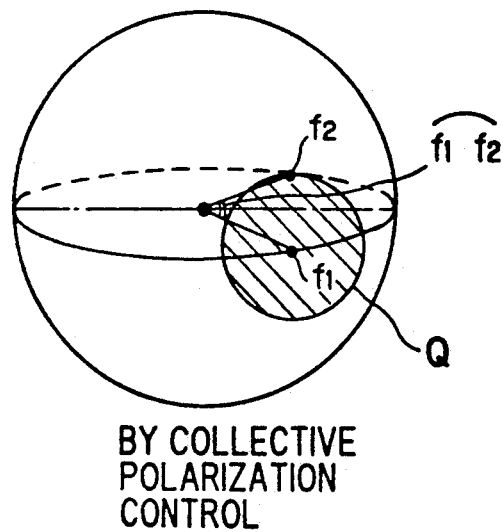

Here, it is assumed that polarizations of FDM signal lights having frequencies $f_1$ and $f_2$ are collectively controlled. The polarization of the signal light having the frequency $f_1$ is moved inside a circle Q by the collective polarization control as shown in FIG. 6B. This circle Q is largest in its diameter, when the polarization change defines the largest circle due to a polarization dispersion as shown in FIG. 6A. In other words, this is a case where two principal states are excited by incident signal lights.

A rotation angle $f_1f_2$ of polarizations between the signal lights of the frequencies $f_1$ and $f_2$ is obtained on Poincaré sphere as expressed in the equation (1).

$$f_1f_2 = \delta\Delta\phi = 2\pi\Delta\tau\cdot\delta f \ldots \quad (1)$$

where $\Delta\phi$ is a phase difference between the principal states, $\Delta\tau$ is a propagating delay time difference between the principal states (corresponding to a polarization dispersion) and $\delta f$ is a difference between the frequencies $f_1$ and $f_2$.

This is described in detail in the aforementioned report by C. D. Poole.

As shown in FIG. 6B, a maximum angle $f_2L$ is equal to the angle $f_1f_2$ at the time of a collective polarization control. Therefore, the maximum power penalty occurs at this time.

An intensity $I_{IF}$ of a receiving intermediate frequency signal is expressed in the equation (2).

$$I_{IF} = \cos^2(f_2L/2) \ldots \ldots \quad (2)$$

The maximum penalty P (dB) is obtained from the equations (1) and (2) as expressed in the equation (3)

$$P = 10 \log I_{IF} = 20 \log (\cos(\pi\Delta\tau\cdot\delta f)) \ldots \quad (3)$$

In the equation (3), the maximum penalty P is calculated to be 0.04 dB at the maximum, where $\Delta\tau$ is 3 ps, and $\delta f$ is 10 GHz as explained in the first preferred embodiment.

Although the two polarization controllers are used in the second preferred embodiment, one polarization controller may be appropriate to carry out a collective polarization control, where a receiving sensitivity is less affected by a polarization dispersion, or the degradation of the receiving sensitivity is permissible. In such a case, a control signal is preferably supplied from the third or fourth receiving system 3 or 4, which is positioned in the center of the whole receiving systems or the vicinity thereof, to the control unit 3 in the second preferred embodiment.

Furthermore, where signal lights, for instance, which are adjacent in frequency, having polarizations orthogonal to each other are received in receiving systems, polarizations of local oscillation lights may be orthogonal in two adjacent receiving systems.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A method for controlling polarizations of signal lights in an optical frequency division multiplex coherent communication system, comprising steps of:
    propagating frequency division multiplex signal lights through an optical fiber;
    controlling polarizations of said frequency division multiplex signal lights collectively;
    controlling relative polarization states of local oscillation lights in receiving systems including optical heterodyne or homodyne receivers to coincide to each other; and
    receiving said frequency division multiplex signal lights having collectively controlled polarizations in accordance with said local oscillation lights separately by said receiving systems.

2. A method for controlling polarizations of signal lights in an optical frequency division multiplex coherent communication system, comprising steps of:
    propagating frequency division multiplex signal lights through an optical fiber;
    controlling polarizations of said frequency division multiplex signal lights collectively; and
    receiving said frequency division multiplex signal lights having collectively controlled polarizations separately by receiving systems including optical heterodyne or homodyne receivers;
    wherein said polarization controlling step includes a step of:
    receiving a control signal from one of said receiving systems which receives a signal light of a frequency to be allocated in the center of a frequency band of said signal light or the vicinity thereof.

3. A method for controlling polarizations of signal lights in an optical frequency division multiplex coherent communication system, comprising steps of:
    propagating frequency division multiplex signal lights through an optical fiber;
    controlling polarizations of said frequency division multiplex signal lights collectively; and
    receiving said frequency division multiplex signal lights having collectively controlled polarizations separately by receiving systems including optical heterodyne or homodyne receivers;
    wherein said polarization controlling step includes a step of:
    dividing said frequency division multiplex signal lights into plural groups, polarization being collectively controlled in each of said plural groups 4. a method for controlling polarizations of signal lights in an optical frequency division multiplex coherent communication system, comprising steps of:
    propagating frequency division multiplex signal lights through an optical fiber, at least one of said signal lights having a polarization orthogonal to those of other signal lights;
    controlling polarizations of said frequency division multiplex signal lights collectively;
    receiving said frequency division multiplex signal lights having collectively controlled polarizations separately by receiving systems including optical heterodyne or homodyne receivers; and
    controlling polarizations of local oscillation lights in said receiving systems, whereby a polarization of at least one of said local oscillation lights corresponding to said at least one of said signal lights is orthogonal to those of other local oscillation lights.

* * * * *

UNITED STATES PATENT AND TRADEMARK OFFICE
CERTIFICATE OF CORRECTION

PATENT NO. : 5,007,693          Page 1 of 3
DATED : April 16, 1991
INVENTOR(S) : Shuntaro YAMAZAKI et al It is certified that error appears in the above-identified patent and that said Letters Patent is hereby corrected as shown below:

Column 2, line 15, delete "collectiv-y", and insert --collectively;

Column 2, line 39, delete "orthogoral", and insert --orthogonal--.

Column 3, line 28, delete "A'B'", and insert --$\overline{A'B'}$--;

Column 3, line 33, delete "A'B'", and insert --$\overline{A'B'}$--;

Column 3, line 35, delete "A'B'", and insert --$\overline{A'B'}$--;

Column 3, line 37, delete "A'B'", and insert --$\overline{A'B'}$--;

Column 3, line 39, delete "A'B'", and insert --$\overline{A'B'}$--;

Column 3, line 40, delete "A'B'", and insert --$\overline{A'B'}$--;

Column 3, line 41, delete "A'B'", and insert --$\overline{A'B'}$--;

Column 3, line 42, delete "A'B'", and insert --$\overline{A'B'}$--;

Colunn 3, line 43, delete "A'B'", and insert --$\overline{A'B'}$--;

UNITED STATES PATENT AND TRADEMARK OFFICE
CERTIFICATE OF CORRECTION

PATENT NO. : 5,007,693

DATED : April 16, 1991

INVENTOR(S) : Shuntaro YAMAZAKI et al

It is certified that error appears in the above-identified patent and that said Letters Patent is hereby corrected as shown below:

Column 3, line 50, delete "A'B'", and insert --$\overline{A'B'}$--;

Column 3, line 53, delete "A'B'", and insert --$\overline{A'B'}$--;

Column 3, line 56, delete "A'B'", and insert --$\overline{A'B'}$--;

Column 3, line 63, after "control", insert --.--.

Column 6, line 25, delete "$f_1 f_2$", and insert --$\overline{f_1 f_2}$--;

UNITED STATES PATENT AND TRADEMARK OFFICE
CERTIFICATE OF CORRECTION

PATENT NO. : 5,007,693

DATED : April 16, 1991

INVENTOR(S) : Shuntaro Yamazaki et al

It is certified that error appears in the above-identified patent and that said Letters Patent is hereby corrected as shown below:

Column 6, line 29, delete "$f_1f_2$", and insert --$\overline{f_1f_2}$--;

Column 6, line 38, delete "$f_2L$" and insert --$\overline{f_2L}$--;

Column 6, line 39, delete "$f_1f_2$", and insert --$\overline{f_1f_2}$--;

Column 6, line 45, delete "$f_2L$" and insert --$\overline{f_2L}$--.

Signed and Sealed this

Fifteenth Day of September, 1992

*Attest:*

DOUGLAS B. COMER

*Attesting Officer*    *Acting Commissioner of Patents and Trademarks*